United States Patent
Maresca et al.

(10) Patent No.: US 7,353,497 B2
(45) Date of Patent: Apr. 1, 2008

(54) METHOD AND SYSTEM FOR PROVIDING AN END-TO-END BUSINESS PROCESS FOR ELECTRONIC SUPPLIER QUALIFICATION AND QUALITY MANAGEMENT

(75) Inventors: John S. Maresca, Hopewell Junction, NY (US); Robert D. Hayes, Poughkeepsie, NY (US); Brent R. Jensen, Austin, TX (US); Edward Kobeda, Raleigh, NC (US); Eric T. Lambert, Wappingers Falls, NY (US); Katherine J. Pearsall, Georgetown, TX (US); Benjamin J. Steele, Jr., Newburgh, NY (US); Michael J. Whitney, Cary, NC (US); Paul A. Zulpa, Woodbury, CT (US)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 09/752,090

(22) Filed: Dec. 29, 2000

(65) Prior Publication Data

US 2002/0087372 A1 Jul. 4, 2002

(51) Int. Cl.
*G06F 9/44* (2006.01)
*G06F 9/46* (2006.01)
(52) U.S. Cl. .................. 717/124; 717/125; 705/7; 705/8
(58) Field of Classification Search ........ 717/124–135; 705/1–45
See application file for complete search history.

(56) References Cited

U.S. PATENT DOCUMENTS

| | | | | |
|---|---|---|---|---|
| 5,442,771 | A * | 8/1995 | Filepp et al. | 709/219 |
| 5,532,928 | A * | 7/1996 | Stanczyk et al. | 705/7 |
| 5,630,049 | A * | 5/1997 | Cardoza et al. | 714/25 |
| 5,765,138 | A * | 6/1998 | Aycock et al. | 705/7 |
| 5,796,967 | A * | 8/1998 | Filepp et al. | 345/764 |
| 6,161,113 | A * | 12/2000 | Mora et al. | 715/505 |
| 6,381,579 | B1 * | 4/2002 | Gervais et al. | 705/8 |

* cited by examiner

*Primary Examiner*—Wei Zhen
*Assistant Examiner*—Qamrun Nahar
(74) *Attorney, Agent, or Firm*—Cantor Colburn LLP; Derek Jennings

(57) ABSTRACT

An exemplary embodiment of the invention relates to an integrated computer-based method and system for facilitating supplier qualification and quality management. This computer-based method and system includes a host system receiving a request from a user system to execute supplier qualification and quality management software, executing the requested software at the host system, sending results of the software execution to the user system, receiving input at the host system from the user system in response to the software execution, and providing the user system with output generated as a result of executing the software. The supplier qualification and quality management software includes a selection module, a qualification module and a quality module.

2 Claims, 5 Drawing Sheets

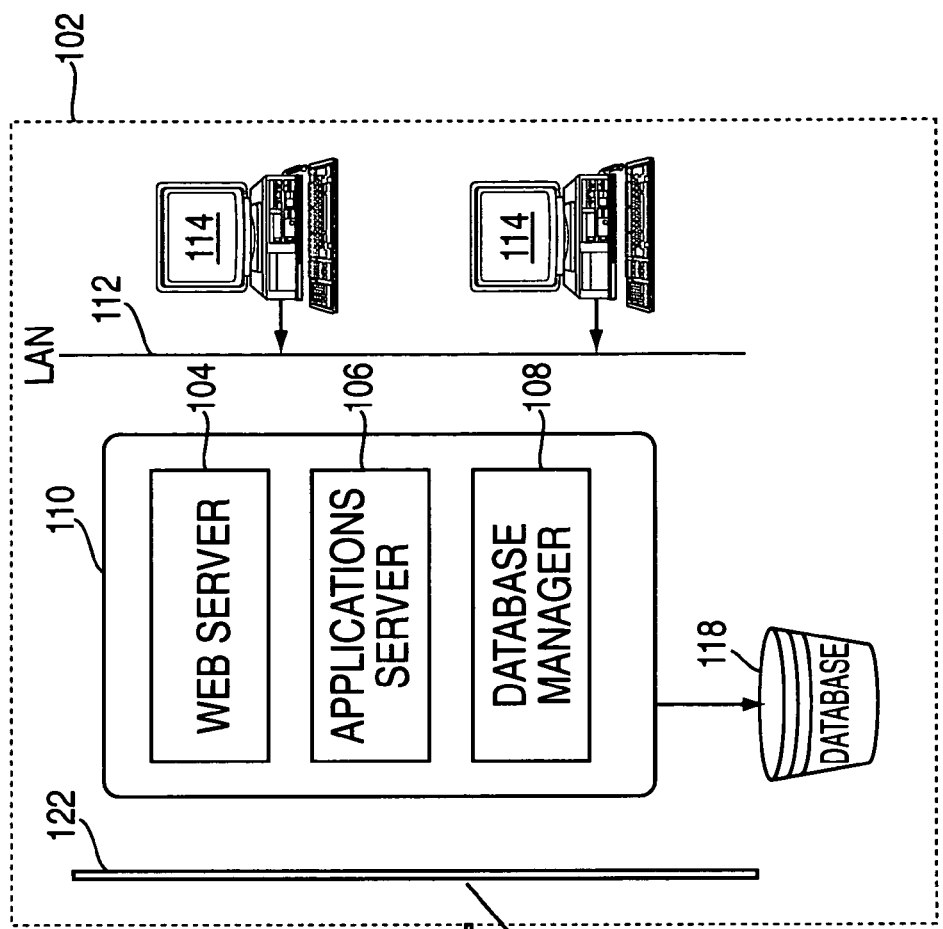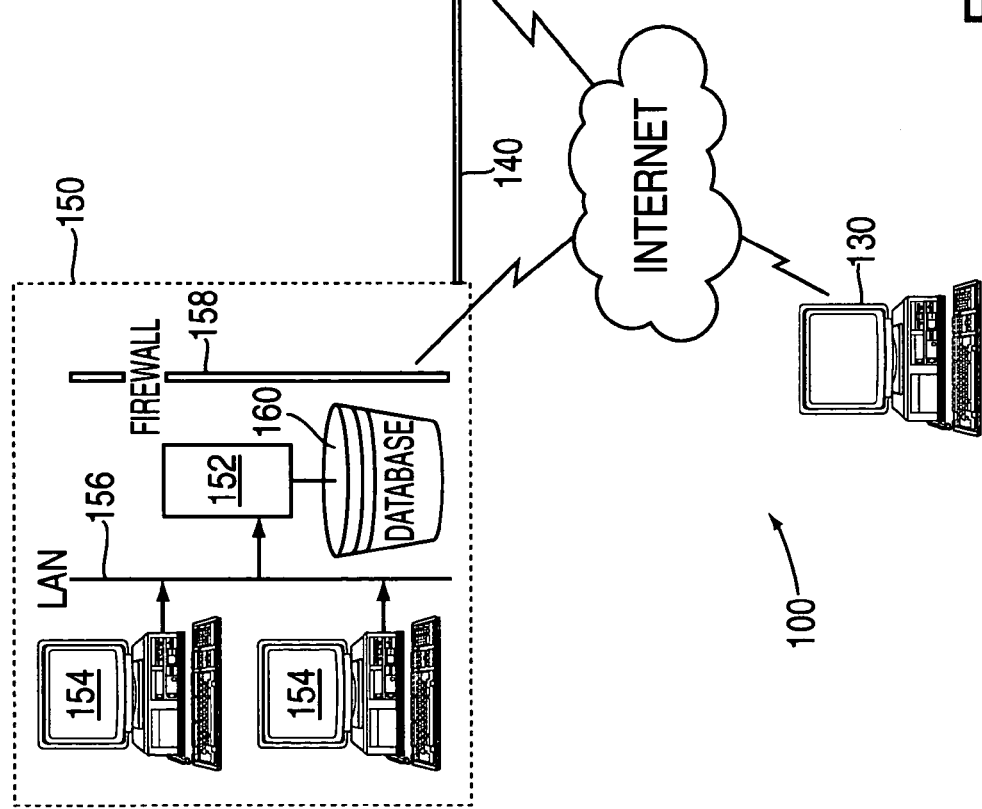
FIG. 1

SELECT ONE OF THE FOLLOWING OPTIONS:

SELECTION —— 302

- SUPPLIER SELECTION —— 304

- AUDIT MANAGEMENT —— 306

QUALIFICATION —— 308

- TECHNOLOGY QUALIFICATION —— 310

- PART QUALIFICATION —— 312

QUALITY —— 314

- PROCESS CHANGE MANAGEMENT —— 316

- SUPPLIER QUALITY MANAGEMENT —— 318

- GENERAL QUALITY PROBLEM RESOLUTION —— 320

FIG. 3        300

METHOD AND SYSTEM FOR PROVIDING AN END-TO-END BUSINESS PROCESS FOR ELECTRONIC SUPPLIER QUALIFICATION AND QUALITY MANAGEMENT

BACKGROUND OF THE INVENTION

This invention relates generally to a computer-based method and system, and more particularly, this invention relates to a computer-based method and system for dynamically providing supplier qualification and quality management information to authorized system users of an original equipment manufacturer (OEM) or organization that outsources the manufacturing of its products to third parties. The invention brings together related business processes and the software that supports them into a streamlined, seamless, real-time, accurate, end-to-end supplier qualification and quality decision support model. It supports the integrated product development (IPD) process, a common methodology used by corporations to develop and introduce new products to market. The steps of IPD include: product concept, develop product definition plan, develop and verify, qualify and certify, ramp-up and launch, and life cycle management. A key component overlaying this six step IPD process is the integration of supplier technologies into an organization's final products. The current invention collaboratively drives supplier technology integration functions such as: supplier selection, supplier audit management, technology qualification, part qualification, process change management, supplier quality management, and general quality problem resolution. The ability to provide electronic end-to-end supplier qualification and quality management, electronic technical collaboration, and the management of the integration of supplier technologies into new products while maintaining high-levels of end product quality is desirable and would enhance the implementation of the IPD process.

In an outsourced world, the key to corporate success is the management of the supply base. Classic models centered on the receipt of manually or electronically sent supplier data followed by the manual analysis of the results. Purchasers of parts are generally very distrustful of supplier input which often results in the re-running of supplier tests to insure proper performance in end-user products. Current processes also result in the inability to easily share information across OEM sites or with suppliers. The purchaser is often working with out of date or inconsistent information because of the lack of a central repository for supplier qualification and quality data. The purchaser for the OEM may not be aware of data relating to the supplier that is being tracked by a different procurement department or OEM site. It is desirable to have all procurement personnel working with the same tools and accessing the same information to ensure consistency and accuracy of information. It is also desirable for suppliers to have access to information pertaining to their own products so that they can be apprised of status and so that they can facilitate the qualification and quality process.

The business climate also dictates moving to global sources and markets to be successful. The ability to tap into all supplier sources and markets using traditional qualification and quality models is greatly diminished. An electronic method to optimize these processes is crucial to business success in today's fast paced, ever-changing world. Procurement organizations that are able to network, rapidly qualify suppliers, and monitor supplier quality will derive a competitive advantage.

A process is therefore required that can provide a means of integrating a variety of tools and data repositories in order to expedite supplier qualification and quality management. This process should also include 24-hour a day access for authorized persons situated around the globe.

BRIEF SUMMARY OF THE INVENTION

An exemplary embodiment of the invention relates to an integrated computer-based method and system for facilitating supplier qualification and quality management. This computer-based method and system includes a host system receiving a request from a user system to execute supplier qualification and quality management software, executing the requested software at the host system, sending results of the software execution to the user system, receiving input at the host system from the user system in response to the software execution, and providing the user system with output generated as a result of executing the software. The supplier qualification and quality management software includes a selection module, a qualification module and a quality module.

BRIEF DESCRIPTION OF THE DRAWINGS

Referring now to the drawings wherein like elements are numbered alike in the several FIGURES:

FIG. 1 is a block diagram of a portion of the system that includes a plurality of workstations and servers on which the supplier qualification and quality management tool is implemented;

FIG. 3 is a sample front-end screen for the supplier qualification and quality management application;

DETAILED DESCRIPTION

Figure 2:
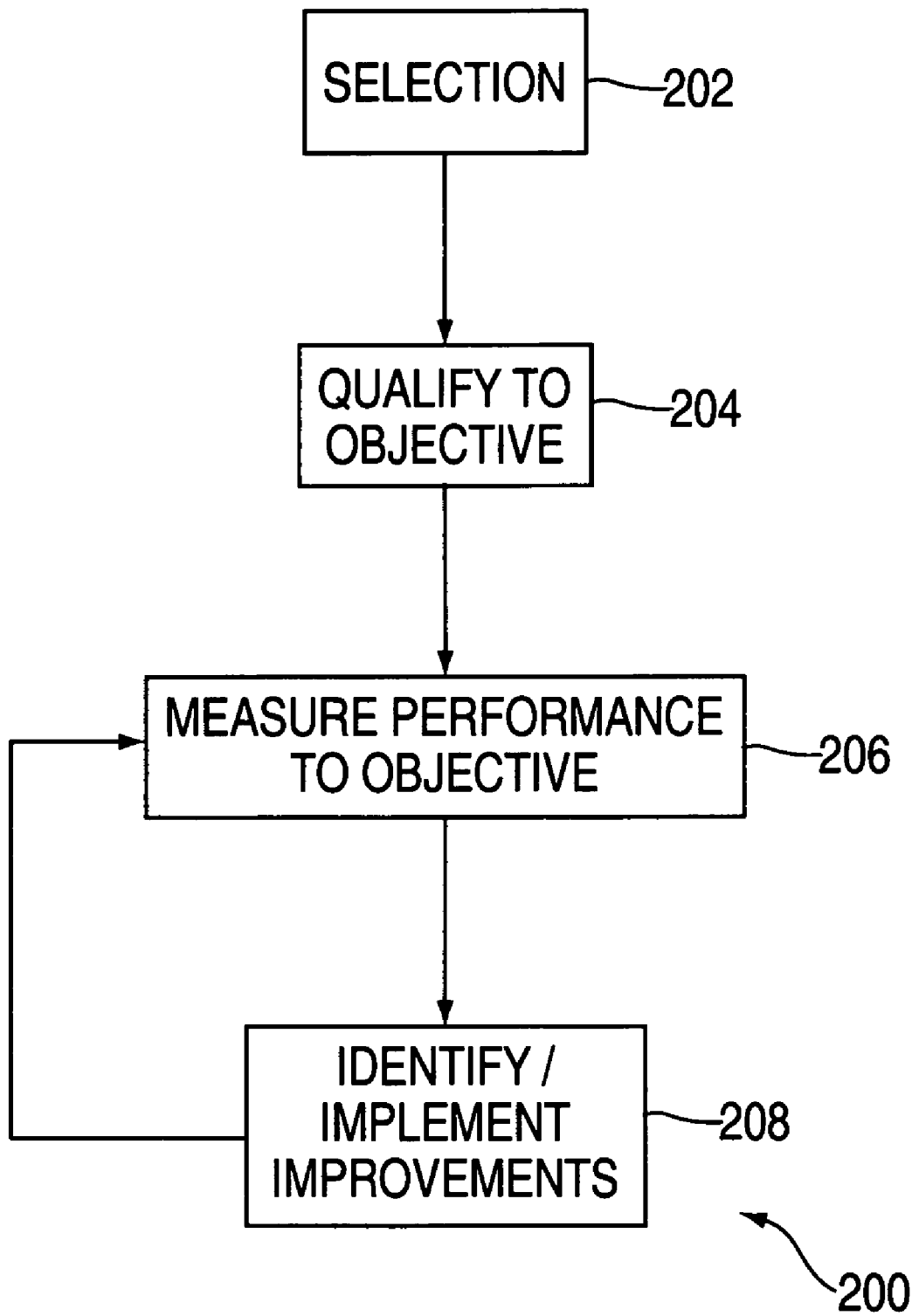
FIG. 2 is a diagram illustrating a high level view of a qualification/quality business process.

In an exemplary embodiment, the supplier qualification and quality management application is implemented through a networked system such as that shown in FIG. 1. Although not necessary to realize the advantages of the present invention, system 100 may be part of a wide area network in which different geographical locations are interconnected, either by high-speed data lines or by radio links, interconnecting hundreds of workstations at widely disparate locations. In the simplified diagram of FIG. 1, system 100 includes an organization 102 comprising a web server 104, an applications server 106, and a database server 108 that are located on a host system 110 and connected through a network 112 to workstations 114. The term "organization" refers to the system implementing the supplier qualification and quality management applications, and is typically an OEM procurement or engineering group. The terms "procurement" and "purchaser" refer to organization 102 entities that are involved with the supplier qualification processes as described herein. The terms "engineers" and "developers" describe generally the types of individuals of organization 102 likely to be implementing the supplier qualification and quality management tool. Network 112, an intranet, may comprise a LAN, a WAN, or other network configuration known in the art. Further, network 112 may include wireless connections, radio-based communications, telephony-based communications, and other network-based communications. For purposes of illustration, however, network 112 is a LAN. A firewall 122 limits access to organization 102 to those network users possessing proper access permissions. In addition, employees of organization 102 may access the application server through a remote device 130 connected to the Internet.

Host system 110 is running suitable web server software designed to accommodate various forms of communications, and which allows information in data storage device 118 to be published on a web site. For purposes of illustration, host system 110 is running Lotus Domino (TM) as its server software. Applications server 106 executes the supplier qualification and quality management software, among other applications utilized by organization 102. The supplier qualification and quality management software can include modules such as supplier selection, supplier audit management, technology qualification, part qualification, process changes, supplier quality management and general quality problem resolution. Applications server 106 is also running a groupware application such as Lotus Notes (TM) which allows remote users to access information through its replication capabilities, provides e-mail services, and supports a secure extranet architecture.

Data storage device 118 resides within intranet 112 and may comprise any form of storage device configured to read and write database type data maintained in a file store (e.g., a magnetic disk data storage device). The data storage device 118 is logically addressable across a distributed environment such as network system 100. The implementation of local and wide-area database management systems to achieve the functionality of data storage device 118 will be readily understood by those skilled in the art. Information stored in data storage device 118 is retrieved and manipulated via database server 108. Data storage device 118 provides a repository for a variety of application information and could include data such as audit reports, technology surveys, change notifications, and problem reports.

System 150 is typically a supplier for organization 102 and may be one of many similar entities requesting access to information at organization 102. System 150 comprises a web server 152 that connects workstations 154 to an intranet 156 and to the Internet. Firewall 158 provides security and protection against unauthorized access to internal network information from outside sources. Each of workstations 154 may access web server 152 via internal web browsers (not shown) located on workstations 154. A data storage device 160 can be coupled to server 152. Additionally, an extranet 140 may exist between system 150 and system 102. System 150 is typically an existing or prospective supplier of organization 102.

The supplier qualification and quality management tool is a set of e-business applications that provide an environment for collaboratively driving supplier technology integration functions such as: supplier selection, supplier audit management, technology qualification, part qualification, process change management, supplier quality management, and general quality problem resolution. Suppliers at system 150 have access to the system in order to review and update information related to their own products. Suppliers and purchasers around the world have 24-hour access to the system.

The goal of the supplier qualification and quality management tool is to expedite the supplier qualification and quality management processes and to increase the quality of the final product produced by organization 102. The tool achieves this goal by providing a common business process and a shared data repository that can be utilized by all authorized personnel involved in the qualification and quality management decision chain. Another goal of the tool is to provide ease of communication between potential suppliers and organization 102 personnel. It achieves this by running on an applications server that is accessible via remote device 130 connected to the Internet via a workstation 154 connected to an extranet 140, or via a workstation 114 connected to the host system's intranet 112. This gives any participant in the supplier qualification and quality management process, with the proper authority, the ability to view and update data as well as the ability to communicate electronically to any other participant in the process. Administration of security and access may be controlled through a gateway application such as IBM'S® Electronic Supply Chain Interlock (ESI) tool, which is described in U.S. patent application Ser. No. 09/658,257, filed on Sep. 8, 2000, entitled "E-Collaboration Commodity Management System and Method", and is incorporated herein by reference in its entirety.

FIG. 2 depicts a high level view of the business process associated with the supplier qualification and quality management tool. The selection step 202 involves selecting a supplier, a technology, and the specific part number. Qualify to objective 204 represents the process in which the features of a specific supplier part number and the specific requirements of the purchaser are compared. This comparison includes looking at form, fit, function, reliability, supply and quality. The last two steps, measure performance to new objective 206 and identify/implement improvements 208, are part of the quality management associated with using supplier parts. Quality management includes: proactive quality management, change management, problem tracking, problem resolution, providing access to real time data, enabling maverick lot initiatives, enabling measurements with actions, and correlating awards to supplier report cards.

FIG. 3 depicts a sample front-end screen 300 for the supplier qualification and quality management tool as seen by a user on workstation 114 or remote device 130. The user logs on to the supplier qualification and quality management tool and is presented with front end screen 300. A supplier at system 150 may be shown a different screen (not shown) displaying limited options in accordance with the supplier's access level granted by organization 102. The supplier qualification and quality management tool is broken down into three categories for the user: Selection 302, Qualification 308, and Quality 314. Each of categories 302, 308, and 314 are further broken down into subcategories as described herein. Selection 302 includes two options, supplier selection 304 and audit management 306. Supplier selection 304 involves retrieving at least one potential supplier based on specific technical requirements. Supplier selection 304 can be accomplished using proprietary selection techniques developed by organization 102 and stored in data storage device 118, or may be accomplished using the development toolkit network software disclosed in U.S. patent application Ser. No. 09/711,777, entitled "Method and System for Dynamically Providing Materials and Technology Information", filed on Nov. 9, 2000, which is incorporated herein by reference in its entirety. The above-referenced application is a selection tool that drives technology convergence between supplier capabilities and customer requirements. The tool is designed to assist the development engineering community in selecting technologies that meet pre-established functional requirements. Supplier selection 304 also enables organization 102 to acquire data pertaining to suppliers and products through network connections or links to electronic catalogs or commercial databases that provide a back-end parts repository for information access over a network. An example of one such company that develops and services these database/catalogs is Aspect Development, Inc®. A development engineer can specify technical requirements via the supplier qualification and quality management tool which will then recommend specific supplier technologies that fit these requirements and are consistent with supplier roadmaps and purchaser product direction.

The other option under selection 302 is audit management 306. Technology shifts are causing new technical suppliers to rise in an ever increasing worldwide space. Before integrating a supplier technology into a purchaser product, a supplier is often subjected to a rigorous audit to ensure that correct technical processes are followed and to ensure technical capability. Supplier audit management 306 supports the audit process. Audit data stored in data storage device 118 is accessed by a user at workstation 114 or remote device 130 via audit management 306 to be read or updated. The audit data is analyzed by representatives of organization 102 and a supplier approval decision is made based on the results of the analysis. Audit data contained in data storage device 118 includes information such as audit schedules, a list of completed audits, and audit reports. Supplier audit management 306 can be performed by using proprietary software developed or procured by organization 102 or may be performed by the quality information network software tool disclosed in U.S. Patent Application, Attorney docket number YOR9-2000-0563US1, filed on Dec. 27, 2000, entitled "Method and System for Gathering and Disseminating Quality Performance and Audit Activity Data in an Extended Enterprise Environment", which is incorporated herein by reference in its entirety. The above-referenced application is a workgroup collaboration tool that allows for the sharing of technical supplier audit data across divisions of organization 102. The referenced software also allows for the sharing of technical supplier audit data directly with the supplier being audited at system 150. This ability to share data allows for streamlined communication with suppliers as well as the elimination of duplicate activities.

In order to get a jumpstart on competition, it has become increasingly critical to quickly qualify new, leading-edge suppliers and to get their technologies integrated into a product. Qualification 308, depicted in FIG. 3 has two options: technology qualification 310 and part qualification 312. In technology qualification 310, an engineer at organization 102 works with a supplier at system 150 and provides the supplier with a series of technical questions that begin the technology qualification process. These "technology surveys" are typically done via mailings, with resulting survey times of one month or more. The electronic solution, technology qualification 310, puts the technology surveys on the world-wide-web and this allows a supplier to quickly fill out the survey and to electronically return it to the correct engineering organization. This results in greatly reduced lead-times and can provide a great time-to-market advantage over competition. Technology qualification 310 includes accessing, for either updating or viewing, technology survey data for a potential supplier. Technology qualification 310 also includes analyzing the technical survey data and qualifying the supplier based on the results of this analysis. Technology qualification 310 can be performed by using proprietary software developed or procured by organization 102 or can be performed by the development toolkit network software referenced above.

The other option under qualification 308 is part qualification 312. The process of qualifying parts is a critical element of integrating a supplier technology into a product. The failure to follow all necessary process steps can have drastic consequences in terms of final product quality. To get a jumpstart on competition, it has become increasingly important to quickly qualify new, leading-edge suppliers and to get their technologies integrated into a final product. A potential supplier part is qualified or not qualified based on an analysis of the qualification data associated with the part. This invention supports this process by providing the ability to access all of the part qualification data through a single computer interface that can be used by everyone involved in the part qualification process. The steps of part qualification 312 include: access part qualification data, analyze the part qualification data, and then qualify a proposed part based on the results of the analysis. Qualification data can be accessed for viewing or updating. Part qualification 312 can be performed by using proprietary software developed or procured by organization 102, or may be performed by using the part qualification software application disclosed in U.S. patent application Ser. No. 09/751,585, filed on Dec. 29, 2000, entitled, "Method and System for Electronically Qualifying Supplier Parts", which is incorporated herein by reference it its entirety. The above-referenced software application package is a collaboration tool that allows for multiple internal entities, all responsible for pieces of the qualification, to be working with the same key pieces of data. The tool acts as a central repository of test activities to insure proper completion and documentation of all necessary steps. In addition, the collaboration data is fed back to the individual supplier to insure accuracy and qualification closure.

Quality 314, depicted in FIG. 3 has three options: process change management 316, supplier quality management 318, and general quality problem resolution 320. Process change management 316 includes both long term and short term changes to a supplier product that are initiated by the supplier. Because changes to supplier parts are common, and perhaps inevitable, a process is required that will allow for collaboration of supplier initiated changes and the ability to ensure that all proper test requirements are met. This helps to ensure a final product of high quality. Process change management 316 includes accessing changes proposed by the supplier, analyzing these changes, and then deciding whether the changes should be accepted. Process change management 316 includes the ability for any person involved in the process, with the proper authority, to access the information, to make comments or updates to the proposed changes, and to communicate electronically with other participants. In an exemplary embodiment this process will be implemented through a collaboration system executed by organization 102, such as the process change notification software tool described in U.S. patent application Ser. No. 09/749,053, filed on Dec. 27, 2000, entitled "Method and System for Facilitating Production Changes in an Extended Enterprise Environment", which is incorporated herein by reference in its entirety. The above-referenced tool uses an algorithm to take the proposed change and to determine where this technology is used in organization's 102 final products. The referenced tool sends requests for action to all affected groups, and then summarizes a response back to the supplier. The tool then ensures that the proper steps are followed for proper closure of the change request. The same kind of a process would also be followed for short term or off-specification changes.

The second option under quality 314 is supplier quality management 318. This option enables a two-phased process of quality management at the supplier and the purchasing organization. The supplier provides key out-going quality metrics to the organization on a periodic basis and the software system automatically notifies key engineers if critical engineering parameters are not being met. This process could be performed using proprietary software developed or procured by organization 102, or by the quality information network software tool referenced above.

General quality problem resolution 320 is the last option under quality 314. The general quality problem resolution 320 system allows engineers to alert other technical users of potential quality problems, raise appropriate issues to management, and collaborate with suppliers on solutions. The process includes the ability to open, close, read and update problem reports. Access to the reports and the ability to update them requires the proper level of system authority. The process also includes the ability to notify other interested parties about the status of the problem reports and the ability to generate summary data on a collection of problem reports. Summary reports could be generated for a variety of data combinations such as: problem reports for a particular supplier, problem reports that have been open for more than a month, problem reports of a critical nature, or open problem reports related to a particular final product. This process could be performed using proprietary software developed or procured by organization 102 or by the problem log software application disclosed in U.S. patent application Ser. No. 09/742,477, filed on Dec. 20, 2000, entitled "Method and System for Handling Production Problems in an Extended Enterprise Environment", which is incorporated herein by reference in its entirety.

A framework for the flow of information associated with the supplier qualification and quality management tool is described from the point of view of two types of system users: suppliers and purchasers or engineers. This flow of information is systematically integrated and organized via the supplier qualification and quality management tool as shown generally in FIG. 3. The flow of information from the point of view of organization 102 is described in FIG. 4. The engineer at organization 102 can access the supplier qualification and quality management tool through the Internet or through an intranet 112. Access to particular types of data and application functions may be restricted to particular individuals in organization 102. The engineer will implement the supplier qualification and quality management tool 402 functions via screen 300 depicted in FIG. 3.

Figure 4:
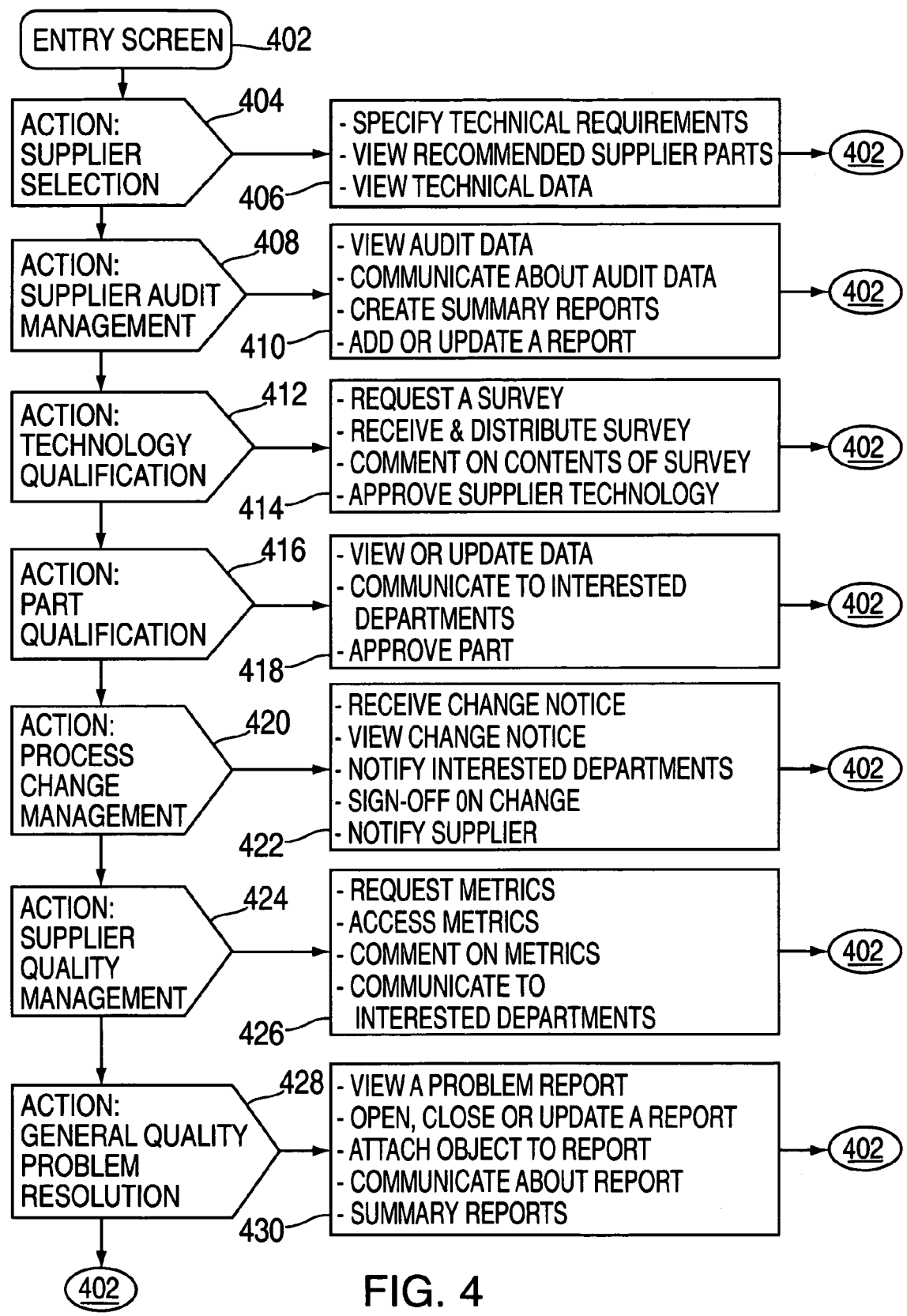
FIG. 4 is a flowchart describing how a purchasing organization utilizes the supplier qualification and quality management tool.

Referring to FIG. 4, when the engineer chooses supplier selection 304 404, host system 110 retrieves selection module 302 from data storage device 118 and queries the engineer at organization 102 to select from the following options: specify technical requirements; view recommended supplier parts; and view data relating to a particular supplier or technology or parts 406. When the engineer chooses audit management 306 408, host system 110 retrieves qualification module 308 from data storage device 118 and queries the engineer at organization 102 to select from the following options: viewing audit reports, schedules or status relating to a particular supplier or part or final product; send an e-mail to the correct personnel, in his own company or in the supplier company, regarding the audit data; create audit executive summary reports; and add or update an audit report 410. When the engineer chooses technology qualification 310 412, host system 110 retrieves qualification module 308 from data storage device 118 and queries the engineer at organization 102 to select from the following options: sending a technology survey to a potential supplier, receiving and distributing a technology survey; commenting on contents of technology survey and signing off on supplier technology 414. When the engineer chooses part qualification 312 416 his options will include viewing or updating part qualification data, sending e-mail to the correct parties about the part qualification data, and signing off on the supplier part 418.

The engineer can also access quality and change management data and functions. If process change management 316 420 is selected, a screen will appear listing options that will allow the engineer to implement the following: receive a change notice from the supplier; view/monitor the status of change notices based on supplier or part or final product; notify and communicate with the correct parties in reference to a change notice; view affected organization comments; sign-off on the change; and notify the supplier of the rejection or acceptance of the change 422. If the engineer selects supplier quality management 318 424, a screen will appear which presents a list of options including: request quality metrics from a particular supplier; access quality metrics; comment on quality metrics; and communicate to the correct parties in the purchasing and supplier organization about the metrics 426. Finally, the engineer may select general quality problem resolution 320 428 in which case a screen will appear that allows the engineer to view/monitor problem reports; open, close or update problem reports; attach objects such as graphics to a problem report; communicate about the status of the problem reports; and create summary reports based on criteria such as supplier, part number or number of days open 430.

Figure 5:
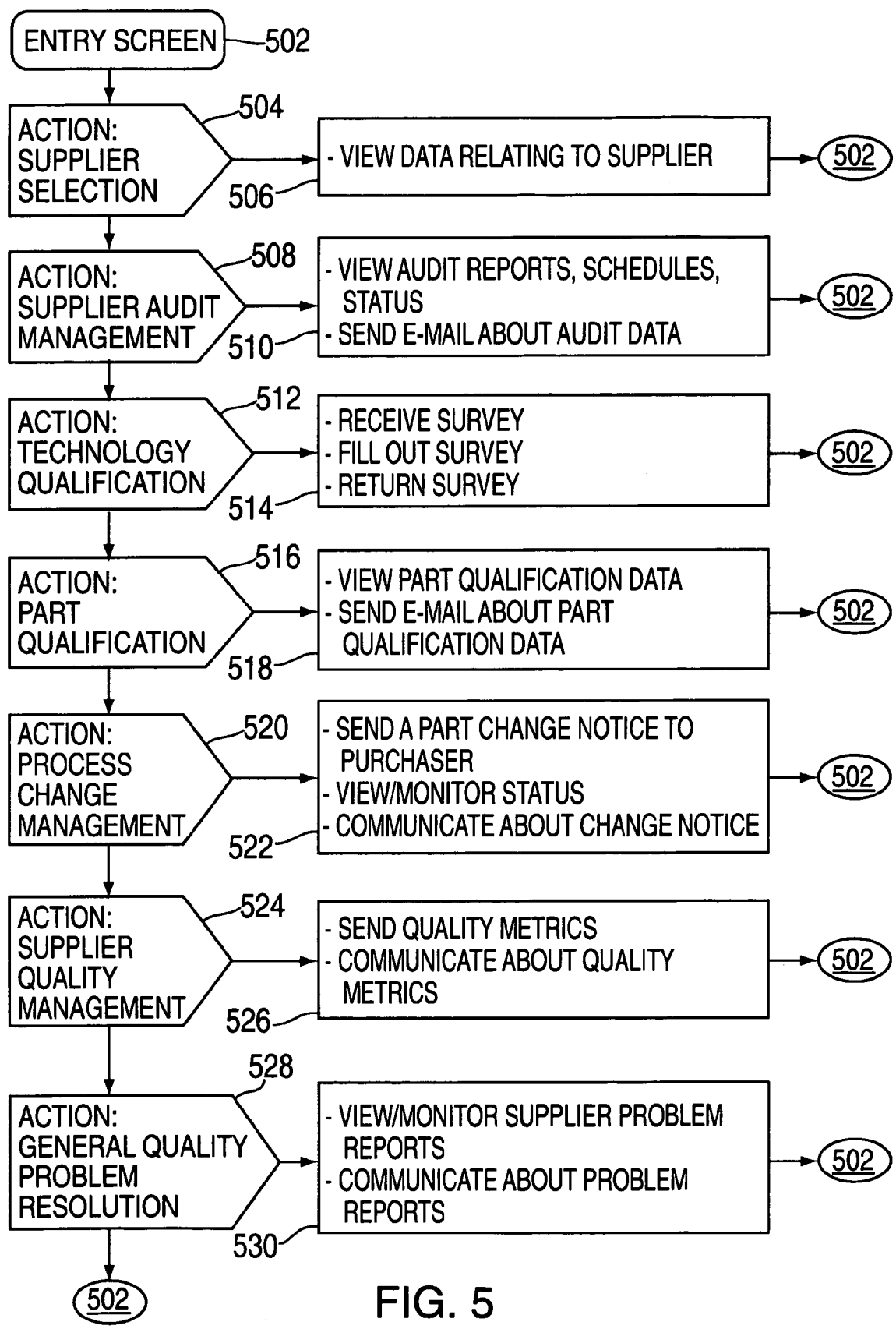
FIG. 5 is a flowchart describing how a supplier organization utilizes the supplier qualification and quality management tool.

FIG. 5 describes the information flow from the point of view of a supplier at system 150 utilizing the supplier qualification and quality management tool. The supplier could be accessing the system through the Internet or through extranet 140. All supplier access is controlled through security in the application software that allows access only to the data that is related to the particular supplier. In addition, the supplier may be restricted, by the software settings, to performing only particular application functions. The supplier logs on to the supplier qualification and quality management tool and host system 110 causes a portion of database 118 to be replicated and presented to the supplier at system 150. The supplier will then initiate an activity via screen 300 depicted in FIG. 3 502.

Referring to FIG. 5, when the supplier chooses supplier selection 304 504, the supplier qualification and quality management tool presents an option allowing the supplier to view technical data relating to the supplier's own company products 506. When the supplier chooses audit management 306 508, the supplier options presented include: viewing audit reports, schedules or status information relating to the supplier's own company; and sending an e-mail to the correct personnel at system 150 or in the engineering enterprise regarding the audit data 510. When the supplier chooses technology qualification 310 512, a screen will appear listing options that include: receiving a technology survey that has been sent by a potential purchaser, filling out a technology survey, and returning a technology survey to the potential purchaser 514. When part qualification 312 516 is selected, options presented to the supplier include viewing part qualification data relating to the supplier's own parts, and sending e-mail to the correct parties about the part qualification data 418.

The supplier can also access quality and change management data and functions. If process change management 316 520 is selected, a screen will appear with options allowing the supplier to send a change notice to the purchaser; view/monitor the status of his change notices; and communicate to the correct parties in reference to a change notice 522. If the supplier selects supplier quality management 318 524 a screen will be presented that lists options including: sending quality metrics to the purchasing organization, and communicating to the correct parties in the purchasing organization about the metrics 526. Finally, the supplier may select general quality problem resolution 320 528 in which case a screen will be presented that allows the supplier to view/monitor problem reports that relate to the supplier's own products; and to communicate to the purchaser about the status of the problem reports 530.

The method and system disclosed in this invention solves the problem of supplier and customer collaboration on both qualification and quality initiatives. This innovative interrelation of the new business process with an e-business framework enables a critical competitive advantage in time to market, cost avoidance through increased quality, elimination of redundancy, and improvement to both internal and external communications. In addition, this invention directly addresses major problems in the business climate including: technical source selection; technology convergence; outgoing final product quality; technical supplier management; technical communications; and secure data sharing among internal purchaser organizations. The creation of the electronic qualification and quality environment allows businesses to efficiently and technically manage their worldwide supplier base, driving dramatic increases in time-to-market and outgoing quality levels. This combination of new business processes and e-business methodologies enable a competitive advantage in time-to-market by allowing the ability to qualify and re-qualify suppliers faster than the competition. It also enables competitive advantages in outgoing final product quality levels due to higher quality levels from the supply base; in cost avoidance due to a reduction in warranty costs, and in communication proficiency including both internal to the purchasing organization and with the supplier. In summary, this invention allows for a customer-supplier qualification and quality process that combines the advantages of e-business with the inherent benefits of end-to-end integration of the entire process flow.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for facilitating supplier qualification and quality management functions in a communications network environment, comprising:
   qualifying suppliers, parts, and technologies in a collaborative network environment via a web-based user interface and shared data repository, said qualifying suppliers, parts, and technologies including:
   acquiring supplier capabilities, part data, and supplier technology data from at least one collaborative source via said web-based user interface, said collaborative source including a supplier, a manufacturing representative, and at least one of an electronic catalog and a commercial data repository;
   storing acquired data in said shared data repository, said acquired data accessible to affected collaborative sources; and
   performing quality management functions via said web-based user interface and shared data repository, said quality management functions including at least one of:
   managing identified changes to a supplier product;
   managing process changes proposed by a supplier; and
   assessing quality metrics provided by a supplier;
   wherein said performing quality management functions includes:
   identifying potential problems relating to a supplier;
   alerting affected collaborative sources of said potential problems;
   notifying management; and
   collaborating with said supplier associated with said potential problems for determining a resolution; and
   generating a problem report.

2. The method of claim 1, wherein problem reports are categorized by at least one of:
   supplier;
   problem reports that have been open for more than one month;
   problem reports of a critical nature; and
   problem reports related to a particular final product.

* * * * *